US010531248B2

(12) United States Patent
Jin et al.

(10) Patent No.: US 10,531,248 B2
(45) Date of Patent: Jan. 7, 2020

(54) METHOD OF FORWARDING COMMUNICATION SERVICE BASED ON VEHICLE AND SYSTEM THEREOF, AND TERMINAL SUPPORTING THE SAME

(71) Applicant: Samsung Electronics Co., Ltd., Gyeonggi-do (KR)

(72) Inventors: Young Kyu Jin, Seoul (KR); Young Ho Rhee, Gyeonggi-do (KR); Young Shil Jang, Gyeonggi-do (KR); Il Ku Chang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/025,658

(22) Filed: Jul. 2, 2018

(65) Prior Publication Data

US 2018/0317059 A1 Nov. 1, 2018

Related U.S. Application Data

(63) Continuation of application No. 13/570,947, filed on Aug. 9, 2012, now abandoned.

(30) Foreign Application Priority Data

Sep. 26, 2011 (KR) .......................... 10-2011-0097003

(51) Int. Cl.
H04W 4/02 (2018.01)
H04W 4/16 (2009.01)
(Continued)

(52) U.S. Cl.
CPC ............... H04W 4/16 (2013.01); H04W 4/48 (2018.02); H04W 4/44 (2018.02)

(58) Field of Classification Search
CPC .... H04M 1/6091; H04M 11/04; H04M 19/02; H04M 3/42263; H04M 3/54;
(Continued)

(56) References Cited

U.S. PATENT DOCUMENTS 5,819,110 A 10/1998 Motoyama
6,603,744 B2 8/2003 Mizutani et al.
(Continued)

FOREIGN PATENT DOCUMENTS

CN 1700717 11/2005
EP 1 111 886 6/2001
(Continued)

OTHER PUBLICATIONS

Korean Office Action dated Feb. 27, 2018 issued in counterpart application No. 10-2011-0097003, 7 pages.
(Continued)

Primary Examiner — Khawar Iqbal
(74) Attorney, Agent, or Firm — The Farrell Law Firm, P.C.

(57) ABSTRACT

An electronic device for forwarding a communication service is provided. The electronic device includes a communication module configured to receive a communication service request from an external electronic device; a display; and a processor configured to detect that the communication module receives the communication service request from the external electronic device, transmit a request signal of transmitting information of electronic devices registered in a vehicle electronic system to the vehicle electronic system, in response to receiving information of electronic devices, control the display to display a list of electronic devices registered in the vehicle electronic system, in response to receiving a user input for selecting one of the electronic devices registered in the vehicle electronic system, forward the received communication service request to the selected electronic device.

17 Claims, 9 Drawing Sheets

(51) Int. Cl.
*H04B 5/00* (2006.01)
*H04W 4/48* (2018.01)
*H04W 4/44* (2018.01)

(58) Field of Classification Search
CPC ........... H04M 1/6083; H04M 1/72519; H04M
1/72544; H04M 1/72552; H04M 1/72566;
H04M 2242/04; H04M 2250/02; H04M
3/5116; H04M 1/56; H04M 1/6066;
H04M 1/6075; H04M 1/723; H04M
2215/2093; H04W 4/008; H04W 4/04;
H04W 4/046; H04W 4/16; H04W 4/00;
H04W 36/18; H04W 4/10; H04W 80/00;
H04W 84/06; H04W 84/18; H04W 92/20;
H04W 88/02; H04B 1/3833; H04B 1/38;
H04B 7/18506; H04B 7/18539; H04L
2209/84; H04L 12/1813; H04L 12/189;
H04L 2012/5612
USPC ....... 455/410, 411, 412, 414.1–414.4, 435.1,
455/550, 566
See application file for complete search history.

(56) References Cited

U.S. PATENT DOCUMENTS

| | | | | |
|---|---|---|---|---|
| 8,204,649 | B2 * | 6/2012 | Zhou | B60W 50/08 701/36 |
| 8,971,927 | B2 * | 3/2015 | Zhou | H04W 48/04 455/414.2 |
| 9,401,978 | B2 * | 7/2016 | Farrell | H04W 76/10 |
| 2003/0224840 | A1 | 12/2003 | Frank et al. | |
| 2004/0072558 | A1 | 4/2004 | Van Bosch | |
| 2005/0260994 | A1 | 11/2005 | Losch | |
| 2006/0177030 | A1 | 8/2006 | Rajagopalan et al. | |
| 2007/0032261 | A1 | 2/2007 | Boyer et al. | |
| 2007/0086579 | A1 | 4/2007 | Lorello et al. | |
| 2008/0056475 | A1 | 3/2008 | Brannick et al. | |
| 2008/0260136 | A1 * | 10/2008 | Rahman | H04M 3/54 379/211.02 |
| 2009/0096596 | A1 | 4/2009 | Sultan | |
| 2010/0027419 | A1 * | 2/2010 | Padhye | H04L 5/0037 370/235 |
| 2010/0330975 | A1 * | 12/2010 | Basir | H04L 67/12 455/418 |
| 2011/0092237 | A1 * | 4/2011 | Kato | H04W 64/003 455/507 |
| 2011/0195699 | A1 * | 8/2011 | Tadayon | H04B 5/0062 455/418 |
| 2012/0282932 | A1 * | 11/2012 | Yu | H04W 84/005 455/437 |
| 2013/0029650 | A1 * | 1/2013 | Xiao | H04W 4/027 455/417 |
| 2013/0059575 | A1 * | 3/2013 | Oesterling | H04W 4/18 455/422.1 |
| 2016/0227021 | A1 * | 8/2016 | Tadayon | H04W 4/50 |

FOREIGN PATENT DOCUMENTS

| | | |
|---|---|---|
| EP | 1 599 057 | 11/2005 |
| JP | 2004-509494 | 3/2004 |
| JP | 2006-507767 | 3/2006 |
| JP | 2006-197388 | 7/2006 |
| JP | 2006-352409 | 12/2006 |
| JP | 2007081498 | 3/2007 |
| JP | 2009-088795 | 4/2009 |
| JP | 2010-081419 | 4/2010 |
| KR | 10-2005-0023139 | 3/2005 |
| KR | 20110061150 | 6/2011 |

OTHER PUBLICATIONS

European Search Report dated Mar. 3, 2015 issued in counterpart application No. 12836300.9-1853.
Chinese Office Action dated Apr. 1, 2017 issued in counterpart application No. 201280047001.0, 21 pages.
Japanese Office Action dated Aug. 29, 2016 issued in counterpart application No. 2014-531705, 13 pages.
Japanese Office Action dated Sep. 22, 2017 issued in counterpart application No. 2014-531705, 8 pages.

* cited by examiner

METHOD OF FORWARDING COMMUNICATION SERVICE BASED ON VEHICLE AND SYSTEM THEREOF, AND TERMINAL SUPPORTING THE SAME

PRIORITY

This continuation application application claims priority under 35 U.S.C. § 120 to U.S. patent application Ser. No. 13/570,947, which was filed in the U.S. Patent and Trademark Office on Aug. 9, 2012, which claims priority under 35 U.S.C. § 119(a) to Korean Patent Application No. 10-2011-0097003, which was filed in the Korean Intellectual Property Office on Sep. 26, 2011, the entire disclosure of each of which is incorporated herein by reference.

BACKGROUND OF THE INVENTION

1. Field of the Invention

The present invention relates generally to communication service forwarding, and more particularly, to a method of forwarding a communication service based on a vehicle for selectively or automatically forwarding a communication service to another terminal when connection of the communication service occurs in at least one terminal in a predetermined group defined based on the vehicle.

2. Description of the Related Art

A portable terminal supports a call function, and has been used in very wide fields due to its convenience of use and portability. Such a portable terminal provides various input schemes to provide user functions. For example, a conventional portable terminal provides a touchpanel and a display unit such that a user may process an operation performed by selecting an image output on the display unit. Further, the portable terminal generates a touch event according to a corresponding user operation and controls an application program corresponding to a user function based on the generated touch event.

A portable terminal user may drive a vehicle. The user of a portable terminal should focus on driving. Using a conventional portable terminal while driving a vehicle may result in motor vehicle crash.

Accordingly, the conventional portable terminal user has used a speaker phone or an earphone to minimize driving distraction. However, using a speaker phone or an earphone while driving may cause a problem of breaking the driver's focus on driving.

SUMMARY OF THE INVENTION

The present invention has been made in view of the above problems, and provides a method of forwarding a communication service based on a vehicle that allows a vehicle driver to pay attention only to driving by forwarding a communication service connection of a terminal located in the vehicle to a certain terminal, a system thereof, and a terminal supporting the same.

The present invention further provides a method of forwarding a communication service based on a vehicle that allows a user to use the communication service in a stable environment although a certain person in the vehicle uses the communication service, a system thereof, and a terminal supporting the same.

In accordance with an aspect of the present invention, an electronic device for forwarding a communication service is provided. The electronic device includes a communication module configured to receive a communication service request from an external electronic device; a display; and a processor configured to detect that the communication module receives the communication service request from the external electronic device, transmit a request signal of transmitting information of electronic devices registered in a vehicle electronic system to the vehicle electronic system, in response to receiving information of electronic devices, control the display to display a list of electronic devices registered in the vehicle electronic system, in response to receiving a user input for selecting one of the electronic devices registered in the vehicle electronic system, forward the received communication service request to the selected electronic device.

In accordance with another aspect of the present invention, a vehicle electronic system for forwarding a communication service is provided. The vehicle electronic system includes a memory configured to store information of electronic devices registered in the vehicle electronic system; a communication module; and a processor configured to in response to receiving a request signal of transmitting the information of electronic devices registered in a vehicle electronic system from a first electronic device, transmit the information of the electronic devices registered in a vehicle electronic system to the second electronic device, in response to receiving a signal for indicating a selected electronic device from the first electronic device, transmit a communication service request to the selected electronic device.

In accordance with another aspect of the present invention, a method for forwarding a communication service is provided. The method includes detecting that a communication module receives a communication service request from an external electronic device; transmitting a request signal of transmitting information of electronic devices registered in a vehicle electronic system to the vehicle electronic system; in response to receiving information of the electronic devices, displaying a list of electronic devices registered in the vehicle electronic system; and in response to receiving a user input for selecting one of the electronic devices registered in the vehicle electronic system, forward the received communication service request to the selected electronic device.

BRIEF DESCRIPTION OF THE DRAWINGS

The aspects, objects, features and advantages of the present invention will be more apparent from the following detailed description in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed descriptions of well-known functions and structures incorporated herein is omitted to avoid obscuring the subject matter of the present invention.

Figure 1:
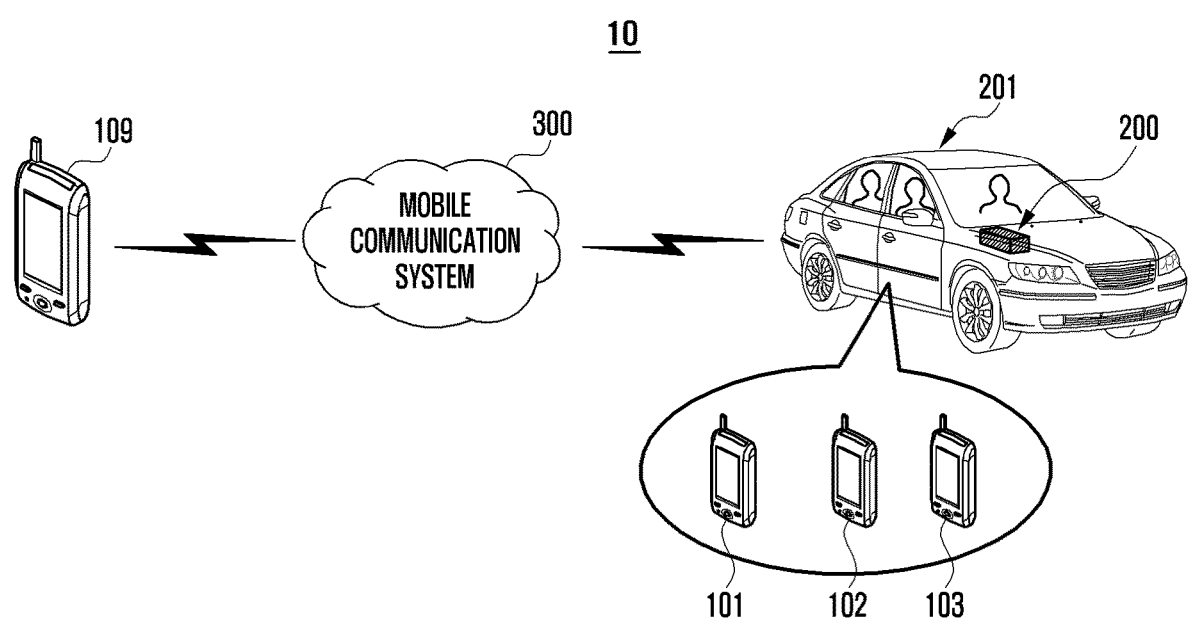
FIG. 1 is a diagram illustrating the configuration of a system for forwarding a communication service based on a vehicle according to an embodiment of the present invention.

FIG. 1 is a diagram illustrating a configuration of a system 10 for forwarding a communication service based on a vehicle according to an embodiment of the present invention.

Referring to FIG. 1, the system 10 for forwarding a communication service based on a vehicle according to the present invention includes a vehicle electronic system 200 provided on a vehicle 201, at least one portable terminals 101, 102, and 103 mounted in the vehicle 201, a transmission terminal 109 requesting communication service connection to the portable terminal 101, 102, and 103, and a mobile communication system 300. Hereinafter, it is assumed that a plurality of portable terminal provided in the vehicle 201. However, only one terminal is located in the vehicle 201 according to situations.

In the system 10 for forwarding a communication service, when certain portable terminals 101, 102, 103 enter the vehicle 201, it establishes a communication channel with the portable terminals 101, 102, 103 to register the portable terminals 101, 102, 103 into the vehicle electronic system 200. Next, when a message requesting communication service connection to a certain portable terminal, for example, a first portable terminal 101, the first portable terminal 101 forwards a communication service connection request message to another terminal, for example, a second portable terminal 102 or a third terminal 103. In this case, the first portable terminal 101 forwards a communication service connection request message to another portable terminal 102 or 103 which is currently registered in a vehicle electronic system 200. The communication service connection request message includes at least one of a message in which the transmission terminal 109 requests a voice call to the first portable terminal 101, a message in which the transmission terminal 109 requests a video phone call to the first portable terminal 101, a message in which the transmission terminal 109 transmits an e-mail or Social Network Service (SNS) message to the first portable terminal 101.

The first portable terminal 101 ensures that the communication service connection request service is forwarded to a certain terminal outside the vehicle 201. Through this, the system 10 for forwarding a communication service allows a user to drive in a stable environment such that a user with the first portable terminal 101 may pay attention to driving.

Further, the system 10 for forwarding a communication service of the present invention transfers the communication service connection request message transferred to the first portable terminal 101 to another portable terminal 102 or 103 such that a person with another portable terminal 102 or 103 uses a corresponding communication service not to lose a contact. To accomplish this, a communication means is provided in a vehicle electronic system 200, which recognizes at least one portable terminal 101, 102, 103 which includes portable terminals in a close range, for example, portable terminals in a vehicle 201.

Accordingly, when at least one portable terminal 101, 102, 103 enters the vehicle 201, the vehicle electronic system 200 recognizes and registers corresponding portable terminals 101, 102, 103, and support communication service forwarding between the registered portable terminals 101, 102, 103. Further, the vehicle electronic system 200 receives forwarding setting information from at least one portable terminal entering the vehicle 201, and forwards a communication service connection request message received based on the received forwarding setting information to another portable terminal. A detailed configuration of a vehicle electronic system 200 for supporting the foregoing function will be given with reference to FIG. 2.

The mobile communication system 300 forms a mobile communication service channel between the portable terminals 101, 102, 103 and the transmission terminal 109. Moreover, the mobile communication system 300 forms a communication service channel with the vehicle electronic system 200, and support signal transmission/reception necessary to support a communication service forwarding function of the present invention. The mobile communication system 300 includes a 2G network device, a 3G network device, and a 4G network device for supporting a communication service between the portable terminal and the transmission terminal 109. Moreover, the mobile communication system 300 communicates with the vehicle electronic system 200 using the foregoing network devices, and support formation of a communication channel between the vehicle electronic system 200, the portable terminals 101, 102, 103, and the transmission terminal 109, if necessary.

The portable terminals 101, 102, 103 are located inside or outside the vehicle according to an operation of the user with the portable terminals 101, 102, 103. In particular, the portable terminals 101, 102, 103 are classified into a first portable 101 possessed by a driver, and a second portable terminal 102 and a third portable terminal 103 possessed by other persons in the vehicle with the driver. Here, the first portable terminal 101 is defined as a terminal transmitting a communication service connection request message, and at least one of a second portable terminal 102 and a third portable terminal 103 is defined as a terminal receiving the communication service connection request message that the first portable terminal 101 forwards. When the first portable terminal 101 is mounted in the vehicle 210 or the transmission terminal 109 transmits a communication service connection request message, the first portable terminal 101 outputs forwarding group information. Accordingly, the first portable terminal 101 user selects a certain terminal which will forward the communication service connection request message. The first portable terminal 101 may automatically forward a communication service to one of the second portable terminal 102 or the third portable terminal 103 belonging to the forwarding group information based on forwarding setting information without receiving a separate selection signal according to user setting. Additionally, the first portable terminal 101 controls a certain portable terminal located outside the vehicle 201 to perform the communication service forwarding. The foregoing embodiment illustrates that three terminals 101, 102, 103 are provided in the vehicle 201. However, the present invention is not limited thereto. That is, there is only one of the portable terminals 101, 102, 103 is in the vehicle 201, and more portable terminal may also exist therein. When only one terminal exists, the first portable terminal 101 performs the foregoing preset communication service forwarding according to forwarding setting information.

The transmission terminal 109 is a terminal transmitting a communication service connection request message to one of the portable terminals 101, 102, and 103. The transmission terminal 109 transmits a call connection request message, an SMS or multi-media message, or at least one of an e-mail or SNS message to one of the portable terminals 101, 102, and 103. A communication service connection request message generated by the transmission terminal 109 is transferred to a certain portable terminal 101, and is forwarded to the second portable terminal 102 or the third portable terminal 103 according to setting of the first portable terminal 101. The transmission terminal 109 returns a message indicating that a communication service forwarding function is being performed according to presence of support of a mobile communication 10, support of the vehicle electronic system 200, and support of portable terminals 101, 102, 103. Accordingly, the transmission terminal 109 informs a user that a communication service connection request message transmitted by the transmission terminal 109 is being forwarded, and receive and output forwarded terminal information according to return information.

As illustrated above, when a user carrying a portable terminal operates in a vehicle mode according to board on the vehicle 201, the system 10 for forwarding a communication service forwards a received communication service connection request message to another portable terminal according to the control of the user or automatically. Accordingly, when the user who possesses the portable terminal is driving a vehicle 201, the system 10 for forwarding a communication service provides an environment in which the driver can pay attention to driving, thereby preventing a motor vehicle crash.

The system 10 for forwarding a communication service informs the transmission terminal 109 that a communication service is forwarded in a communication service forwarding procedure such that the transmission terminal 109 operates a communication service in a state it recognizes the communication service forward situation. An alarm message indicating during or termination of the communication service forwarding becomes at least one of a first portable terminal 101 and a vehicle electronic system 200 instructing communication service forwarding. In this procedure, at least one of the first portable terminal 101 and the vehicle electronic system 200 simultaneously transmits information indicating that the first portable terminal 101 operates in a vehicle mode and forwarding group information to the transmission terminal 109, and simultaneously transmits information indicating a terminal, for example, a second portable terminal 102 as a forwarding terminal. The transmission terminal 109 then operates a communication service in a state in which the first portable terminal 101 recognizes that a driver is driving the vehicle 201 and performs a communication service forwarding with a second portable terminal 102.

Further, the first portable terminal 101 transfers information indicating that a vehicle mode is operated and forwarding setting information having information designated as a forwarding terminal by the first portable terminal 101, for example, information designating the second portable terminal 102 as an automatic forwarding terminal to the transmission terminal 109. At the same time, when receiving a communication service connection request from the transmission terminal 109, the first portable terminal 101 controls such that a corresponding connection request message is forwarded to the second portable terminal 102. The first portable terminal 101 outputs the reception of a communication service connection request message and a message indicating automatic forwarding of the second portable terminal 102 to a display unit. The second portable terminal 120 is a terminal located in the vehicle 201 or in another place outside vehicle 201.

Figure 2:
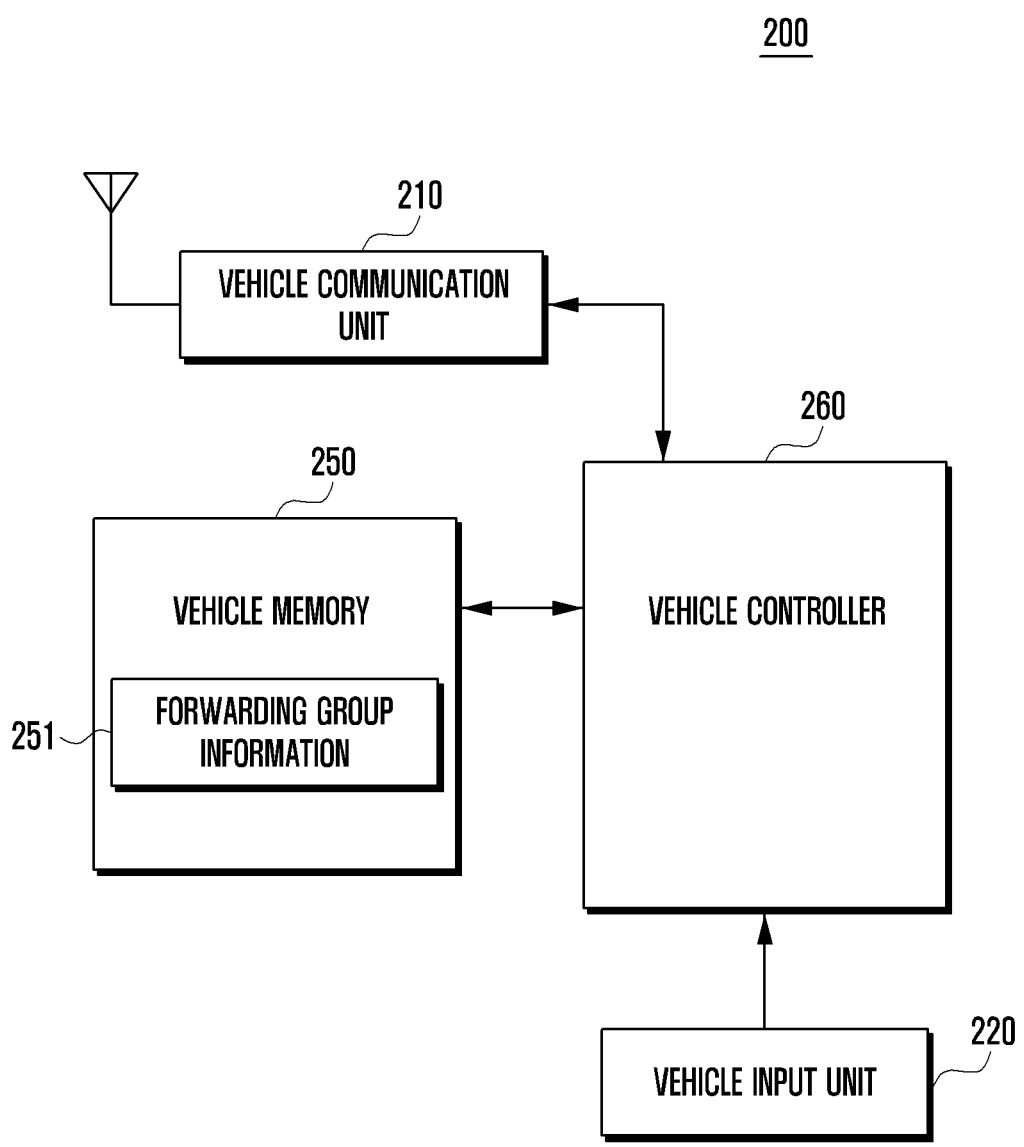
FIG. 2 is a block diagram illustrating a vehicle electronic system shown in FIG. 1 in detail.

FIG. 2 is a block diagram illustrating a vehicle electronic system 200 shown in FIG. 1 in detail.

Referring to FIG. 2, a vehicle electronic system 200 includes a vehicle communication unit 210, a vehicle input unit 220, a vehicle memory 250, and a vehicle controller 260. The vehicle electronic system 200 recognizes at least one portable terminal 101, 102, 103 located in a vehicle 201 based on the vehicle communication unit 210 and generates a communication service-forwarding group according to recognition of the portable terminals 101, 102, and 103. Then, at least one of the portable terminals 101, 102, and 103 receives forwarding group information from the vehicle electronic system 200, and forward a receive communication service connection request message based on the received forwarding group information to another portable terminal.

As illustrated above, the vehicle communication unit 210 recognizes portable terminals 101, 102, 103, and supports information transmission/reception necessary for registration of the portable terminals 101, 102, 103 for generating a communication service-forwarding group. To accomplish this, when power supplied to the vehicle communication unit 210, it performs message broadcasting for searching whether there are portable terminals 101, 102, 103 around it with a constant period. The vehicle communication unit 210 includes at least one of communication module, for example, a ZigBee module, a Z-Wave module, an Ethernet module, a WiFi module, or a Bluetooth module capable of communicating with portable terminals 101, 102, 103, and form a communication channel with portable terminals 101, 102, 103 with the communication module. The vehicle communication unit 210 performs a function of a base station or an Access Point (AP) capable of recognizing the portable terminals 101, 102, 103. When the portable terminals 101, 102, 103 are recognized, the vehicle communication unit 210 collects identification information of corresponding portable terminals 101, 102, 103 automatically or through an authentication procedure. The collected identification information is transferred to the vehicle controller 260. Here, the identification information includes various information such as phone numbers, IDs, and photographs of portable terminals 101, 102, and 103 as information for identifying the respective portable terminals 101, 102, and 103. The foregoing IDs of the portable terminals 101, 102, and 103 is registered as each item of forwarding group information.

The vehicle input unit 220 is configured for generating an input necessary for controlling the vehicle electronic system 200. The vehicle input unit 220 generates an input signal for supplying power to the vehicle electronic system 200 and an input signal for activating the vehicle communication unit 210 according to the control of a passenger. Further, the vehicle input unit 220 generates an input signal for manually inputting forwarding setting information and an input signal for manually inputting identification information based on the control of the passenger. The generated input signals are transferred to the vehicle controller 260 and converted to a command language for communication service forwarding of the present invention.

The vehicle memory 250 stores an Operating System (OS) necessary to operate the vehicle electronic system 200 and various application programs necessary for operating the vehicle. In particular, the vehicle memory 250 stores forwarding group information 250 configured by identification information of the portable terminals 101, 102, and 103 registered in the vehicle electronic system 200. The forwarding group information 251 by identification information of terminals performing registration of portable terminals 101, 102, and 103 communicating with a vehicle communication unit 210 of the vehicle electronic system 200. The forwarding group information 251 is transmitted to the portable terminals 101, 102, 103.

The vehicle controller 260 controls activation of the vehicle electronic system 200 based on the control of the passenger, and controls various signal flows necessary to support a communication service forwarding function of the present invention. For example, the vehicle controller 260 controls a vehicle communication unit 210 for recognizing portable terminals 101, 102, and 103 located in the vehicle 201, collecting identification information of recognized terminals, generating forwarding group information 251 based on the collected identification information, distributing the generated forwarding group information 251, and forwarding a communication service when a certain portable terminal, for example, the first portable terminal 101 receives the communication service connection request message.

More specifically, when a passenger, for example, a driver, generates an input signal for recognizing peripheral portable terminals 101, 102, 103 or it is set such that peripheral portable terminals 101, 102, and 103 are recognized, the vehicle controller 260 controls the vehicle communication unit 210 to perform message broadcasting for recognizing peripheral portable terminals 101, 102, and 103. The vehicle controller 260 collects identification information of the portable terminals 101, 102, 103 from the portable terminals 101, 102, and 103 responding to corresponding message broadcasting. The identification information includes phone number information, phone-book information, and photograph information of corresponding portable terminal. The identification information may only include a phone number, and a passenger may separately input name information and photograph information as the identification information. Further, the vehicle controller 260 requests identification with various information such as phone numbers or images to the respective portable terminals 101, and receive corresponding identification information from the portable terminals 101, 102, and 103.

When the collection of the identification information is terminated, the vehicle controller 260 generates forwarding group information 251 based on the identification information of the portable terminals 101, 102, and 103. In this procedure, the vehicle controller 260 registers a certain portable terminal, for example, a first portable terminal 101 as a driver terminal, and the second portable terminal 102 and the third portable terminal 103 as a follower passenger terminal. To accomplish this, the vehicle controller 260 registers a driver terminal based on intensity of a transmission/reception signal in a communication procedure. The passenger controls the vehicle input unit 220 to register a terminal corresponding to certain identification information as the first portable terminal 101 as the driver terminal.

When generation of the forwarding group information is terminated, the vehicle controller 260 transmits corresponding forwarding group information 251 to the first portable terminal 101. The vehicle controller 260 transmits the forwarding group information 251 to all the first to third terminals 101, 102, and 103. The vehicle controller 260 provides the forwarding group information 251 to only a portable terminal requesting it.

If the communication service forwarding function is activated, that is, if a communication service connection request message is transmitted to a certain portable terminal, a corresponding portable terminal requests the forwarding group information 251 to the vehicle controller 260. Then, the vehicle controller 260 provides the forwarding group information 251 to a corresponding portable terminal. As illustrated previously, when the vehicle controller 260 previously provides the forwarding group information 251 to portable terminals 101, 102, and 103, a separate procedure for the forwarding group information 251 is omitted. When the portable terminal receiving the communication service connection request message selects a forwarding function, the vehicle controller 260 controls a portable terminal selected as a forwarding function to perform a communication service function of a corresponding portable terminal.

For example, if the transmission terminal 109 transmits a communication service connection request message to a first portable terminal not receiving the forwarding group information 251, the vehicle controller 260 provides the forwarding group information 251 to the first portable terminal 101. Further, if the first portable terminal 101 designates the second portable terminal 101 as a forwarding selection terminal, the vehicle controller 260 forwards a communication service connection request message to the second portable terminal 102. When receiving the communication service connection request message, the second portable terminal 102 outputs it and performs a communication service function with a transmission terminal 109 according to the preference of the user. In this procedure, the vehicle controller 260 ensures that a communication service is forwarded based on a communication service path including the transmission terminal 109, the mobile communication system 300, the first portable terminal 101, the vehicle communication unit 210, and the second portable terminal 102. When forwarding selection terminal information of the first portable terminal 101 is provided to the mobile communication system 300, the vehicle controller 260 ensures that a communication service is performed based on a communication service path including the transmission terminal 109, the mobile communication system 300, and the second portable terminal 102. Various communication service paths will be described in detail with reference to following drawings.

Figure 3:
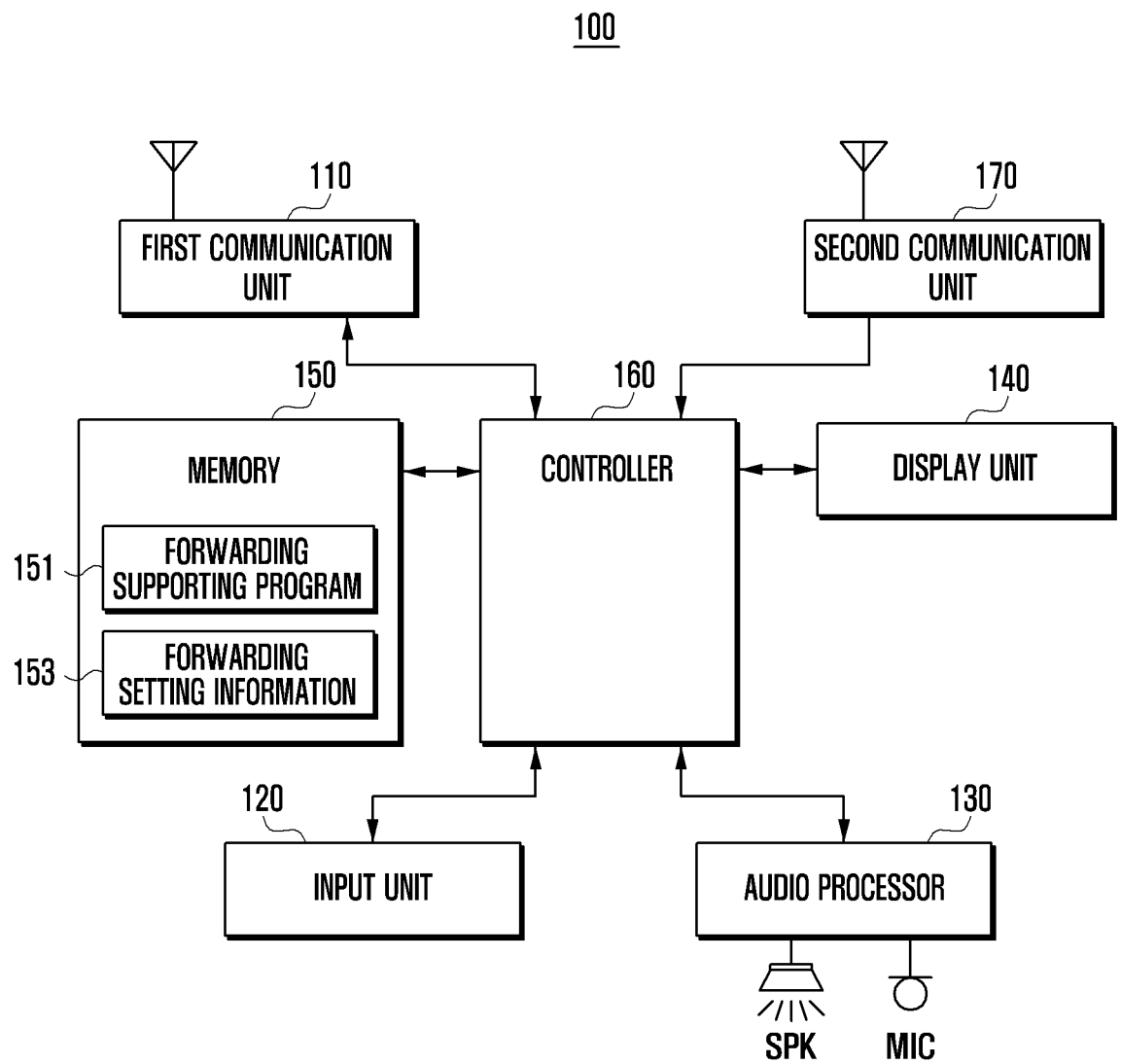
FIG. 3 is block diagram illustrating a portable terminal shown in FIG. 1 in detail.

FIG. 3 is block diagram illustrating one of portable terminals 101, 102, and 103 in detail according to an embodiment of the present invention. Portable terminals 101, 102, and 103 illustrated in FIG. 1 were described above. Portable terminal 100 is similar to portable terminals 101, 102, and 103 and it will be described with reference to a configuration of one portable terminal. Hereinafter, in order to describe a forwarding function, it is assumed that a terminal receiving a communication service connection request message is a first portable terminal 101, and a forwarding selection terminal is a second portable terminal 102. This distinction will illustrate a communication service forwarding function. However, the present invention is not limited thereto. That is, all terminals located in the vehicle 201 are terminals performing a communication service forwarding function according to setting of a passenger or a driver. A certain terminal not located in the vehicle 201 act as a forwarding selection terminal of the first portable terminal 101.

Referring to FIG. 3, a portable terminal 100 of the present invention includes a first communication unit 110, a second communication unit 170, an input unit 120, an audio processor 130, a display unit 140, a memory 150, and a controller 160. Although this embodiment illustrates that the portable terminal 100 includes two communication units, the present invention is not limited thereto. That is, the first communication unit 110 and the second communication unit 170 is configured by one communication module, for example, a 3G or 4G support communication module, and accordingly the portable terminal 100 communicates with a vehicle electronic system 200 and the mobile communication system 300 based on the one communication module. Accordingly, it will be understood that the first communication unit 110 and the second communication unit 170 identify a subject for performing communication. As a result, a portable terminal 100 of the present invention is operated by one communication module or a plurality of communication modules. Further, the portable terminal 100 of the present invention includes an input unit 120 and a display unit 140 for supporting a touch function as input means for generating input signals.

The first communication unit 110 is configured by a communication module capable of establishing a communication channel with the mobile communication system 300. The first communication unit 110 establishes a communication channel for voice call, a communication channel for video call, and a communication channel for transmitting data such as images or messages under the control of the controller 160. That is, the first communication unit 110 establishes a voice call channel, a data communication channel, and a video call channel with the mobile communication system 300. In particular, the first communication unit 110 of the first portable terminal 101 of the present invention receives and transfers a communication service connection request message to the controller 160, and transfers data associated with a communication service received from the transmission terminal 109 to the second communication unit 170 under a control of the controller 160. Further, the first communication unit 110 of the first portable terminal 101 transfers data associated with a communication service received by the second communication unit 170 to the transmission terminal 109 through the mobile communication system 300.

The first communication unit 110 of the second portable terminal 102 directly establishes a communication channel with the transmission terminal through the mobile communication system 300 after communication service forwarding is terminated from the first portable terminal 101 according to a system design scheme. To accomplish this, if the communication service forwarding of the first portable terminal 101 is performed, the first communication unit 110 of the second portable terminal 102 is activated under the control of the fellow passenger or automatically.

The second communication unit 170 is configured by a communication module capable of establishing a communication channel with a vehicle communication unit 210 included in the vehicle electronic system 200. Accordingly, when the vehicle communication unit 210 is configured by a near-distance communication module, the second communication unit 170 is configured by a near-distance communication module compatible with the vehicle communication unit 210. The portable terminal 100 establishes a communication channel with the vehicle electronic system 200 based on the second communication unit 170 to provide identification information for generating forwarding group information to the vehicle electronic system 200.

In particular, the second communication unit 170 of the first portable terminal 101 transfers a communication service connection request message received from the transmission terminal 109 to the second communication unit 170 of the second portable terminal 102 through the vehicle communication unit 210 under the control of the user. The second communication unit 170 of the second portable terminal 102 receives the communication service connection request message and transfers the received communication service connection request message to the controller 160 to inform it that it is forwarded from the first portable terminal 101. When the second portable terminal 102 user accepts forwarding, the second portable terminal 102 transfers it to the first terminal 101, and performs a communication service with the transmission terminal 109 based on a communication service path including the transmission terminal 109, the first communication unit 110, the second communication unit 170, the vehicle communication unit 210, and of the first portable terminal 101. The second portable terminal 102 operates the first communication unit 110 to exclude the first portable terminal 101 and the vehicle communication unit 210, and to directly communicate with the transmission terminal 109.

The input unit 120 generates various input signals necessary for the operation of the portable terminal 100 under the control of the user. The input unit 120 includes a plurality of input keys and function keys for receiving input of numerals or character information, and setting various functions. The function keys include arrow keys, side keys, and shortcut keys set to perform certain functions. Further, the input unit 120 generates and transfers key signals associated with user setting and function control of the portable terminal 100 to the controller 160. The input unit 120 is implemented by using a Qwerty keypad, a 3*4 keypad, or a 4*3 keypad, or the like including a plurality of keys. Further, the input unit 120 is implemented by a Qwerty key map, a 3*4 keypad, a 4*3 keypad, a menu map, a control key map, or the like output on the display unit 140. Further, when the display unit 140 of the portable terminal 100 is supported in the form of a full touchscreen, the input unit 120 includes only side keys provided at a side surface of a case of the portable terminal 100. The input unit 120 generates and transfers an input signal for setting an automatic vehicle mode operation or a vehicle mode release operation to the controller 160. In particular, when receiving the communication service connection request message, the input unit 120 of the first portable terminal 101 generates an input signal for request such that a corresponding message is forwarded to the second portable terminal 102. When receiving the communication service connection request message forwarding, the input unit 120 of the second portable terminal 102 generates an input signal accepting forwarding or generates an input signal such that a message forwarded to another portable terminal, for example, a third portable terminal 103 is again forwarded.

The audio processor 130 outputs various audio data necessary for operating the portable terminal 100, and supports a function collecting audio data to support a call function of the portable terminal 100. To accomplish this, the audio processor 130 includes a speaker SPK for outputting audio data and a microphone MIC for collecting the audio data. In particular, the audio processor 130 of the present invention outputs various effect sounds or guide sounds corresponding to audio data indicating vehicle mode performing by a portable terminal 100 registered in the vehicle communication unit 210, audio data informing the user of the reception of a communication service connection request message from the transmission terminal 109 while in vehicle mode, audio data informing the user of the occurrence of message forwarding, and audio data informing acceptance of a forwarding function. The audio processor 130 may not output a corresponding sound effect or guide sound according to user setting. The output of the audio data is substituted by a vibration function.

When the portable terminal 100 is configured by a touch-screen, the display unit 140 includes a display panel and a touchpanel. The display unit may include a structure in which a touchpanel is located in a front surface of a display panel.

The display panel displays information input by the user and information provided to the user as well as various menus. That is, the display panel provides various screens, for example, an idle screen, a menu screen, a message creation screen, and a call screen according to utilization of the portable terminal 100. The display panel is a Liquid Crystal Display (LCD) or an Organic Light Emitted Diode (OLED) and the like. Furthermore, the display panel is located in an upper part or a lower part of the touchpanel. Particularly, the display panel of the present invention outputs various screens necessary for applying a communication service forwarding function. The various screens will be described in detail with reference to following drawings.

The touchpanel is located in one of an upper part or a lower part of the display panel, generate a touch event according to contact of a touch object, for example, user finger, and transfer the generated touch event to the controller 160. In this case, a sensor configuring the touchpanel is arranged in a matrix pattern. Corresponding location information with respect to a touch event occurring on the touchpanel and information about a type of touch event are transferred to the controller 160. In particular, the touchpanel of the present invention is set according to a screen corresponding to a communication service forwarding function. For example, when an icon or an image corresponding to at least one terminal included in the forwarding group information 251 are output on the display panel, the touchpanel is set to select corresponding image or icon. The set touchpanel generates a touch event according to a user touch and transfers the generated touch event to the controller 160.

The memory 150 stores a key map or a menu map for operating the display unit 140 as well as application program necessary for a function operation according to an embodiment of the present invention. The key map or the menu map is various forms. That is, the key map becomes a keyboard map, a 3*4 key map, a Qwerty key map, or a control key map for controlling an operation of a currently activated application program. Further, the menu map is used as a menu map for controlling a currently activated application program. The memory 150 may include a program area and a data area.

The program area stores an OS for booting the portable terminal 100 and operating the foregoing structural elements, and application programs for playing various files, for example, an application program for supporting a call function of the portable terminal 100, a web browser accessing an Internet server, an MP3 application program for playing sounds, an image output application program for displaying photographs, and a moving image playback application program. In particular, the program area of the present invention stores a forwarding support program 151.

The forwarding support program 151 is a program for supporting a communication service forwarding function of the portable terminal 100. When the portable terminal 100 enters a vehicle mode or when receiving a communication service connection request message after it enters the vehicle mode, the forwarding support program 151 is loaded into the controller 160 and supports a communication service forward function of the present invention. To accomplish this, the forwarding support program 151 includes a routine for operating the second communication unit 170, a routing providing identification information according to a request of the vehicle communication unit 210, a routine for receiving and storing the forwarding group information 251, a routine for requesting and receiving the forwarding group information 251 to the vehicle electronic system 200 when the communication service connection request message is received from the transmission terminal 109, and a routine for outputting the received forwarding group information 251 to the display unit 140. The forwarding support program 151 includes a routine for forwarding a communication service connection request message to a forwarding terminal selected from the forwarding group information 251, for example, a second portable terminal, and a routine for performing communication service forwarding between the transmission terminal 109 and the second portable terminal 102 when the second portable terminal 102 accepts the forwarding.

The data area is an area for storing data created according to use of the portable terminal 100, and stores phone-book data, at least one icon according to a widget function, and various contents. Further, the data area stores user input provided from the touchpanel. In particular, the data area stores forwarding setting information 153.

The forwarding setting information 153 becomes forwarding selection terminal information previously defined by the user. The portable terminal forwarding setting information 153 provides forward setting information 153 to the vehicle electronic system 200 in a vehicle mode entering procedure. The portable terminal forwarding setting information 153 designates the second portable terminal 102 as an automatic forwarding selection terminal, and designation information is provided to the vehicle electronic system 200 as the forward setting information. If the forwarding group information 251 is received from the vehicle electronic system 200, the portable terminal forwarding setting information creates forwarding setting information 153 designating a certain terminal included in the received forwarding group information 251 as the automatic forwarding selection terminal, and feed it back to the vehicle electronic system 200.

The vehicle electronic system 200 then stores the forwarding setting information 153 in the vehicle memory 250. When the first portable terminal 101 performs a communication service forwarding function, the vehicle electronic system 200 forwards the communication service connection request message to the second portable in the forward setting information 153. In this procedure, the first portable terminal 101 does not output separate forwarding group information 251, and receives an input signal with respect to whether to perform a communication service forwarding function.

Further, when receiving a corresponding input signal, the first portable terminal 101 provides a communication service connection request message to the vehicle electronic system 200, and the vehicle electronic system 200 automatically transfers the communication service connection request message to the second portable 102. The first portable terminal 101 or the vehicle electronic system 200 receiving the forwarding setting information 153 from the first portable terminal 101 provides the forwarding setting information 153 to the mobile communication system 300. The mobile communication system 300 then transfers a communication service connection request message of a transmission terminal 109 to the second portable terminal according to a vehicle mode entry of the first portable terminal 101 or signal feedback according to generation of an input signal for activating a forwarding function.

The controller 160 controls power supply to respective structural elements of the portable terminal 100 to perform an initializing procedure. Further, the controller 160 controls various signal flows necessary for applying a communication service forwarding function of the present invention. To accomplish this, the controller 160 includes a configuration as illustrated in FIG. 4.

Figure 4:
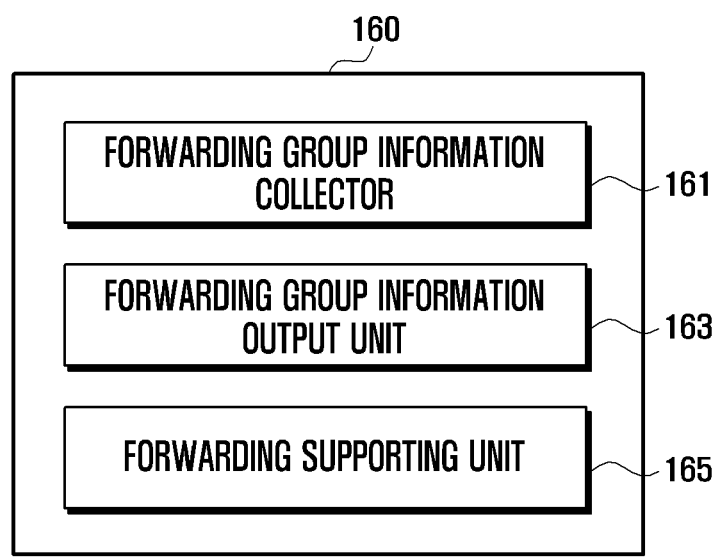
FIG. 4 is a block diagram illustrating a controller shown in FIG. 3 in detail.

FIG. 4 is a diagram illustrating a configuration of a controller 160 of the portable terminal forwarding setting information 153 according to the present invention.

Referring to FIG. 4, the controller 160 includes a forwarding group information collector 161, a forwarding group information output unit 163, and a forwarding supporting unit 165.

When a portable terminal enters in the vehicle 201, the forwarding supporting unit 165 receives a message that a vehicle communication unit 210 included in a vehicle electronic system 200 broadcasts. The controller 160 then establishes a communication channel with the vehicle electronic system 200, and automatically registers in the vehicle electronic system 200 according to the user control or an access history. In the registration procedure, the controller 160 provides identification information of the forwarding supporting unit 165 to the vehicle electronic system 200. The vehicle electronic system 200 performs a function of an AP with respect to the forwarding supporting unit 165. Receiving identification information from the forwarding supporting unit 165, the vehicle electronic system 200 generates forwarding group information 251 based on the received identification information. If the registration in the vehicle electronic system 200 is terminated, the controller 160 determines that it has entered vehicle mode, and outputs an indicator informing of a corresponding operation, for example, a vehicle mode entry to an indicator region.

The forwarding group information collector 161 is an element collecting forwarding group information 251 generated by the vehicle electronic system 200. In the case in which the vehicle electronic system 200 generates the forwarding group information 251 according to a design scheme of a system designer, when the forwarding group information 251 is transferred regardless of the generation of a separate event, the forwarding group information collector 161 of the first portable terminal 101 receives the forwarding group information 251 and control the memory 150 to stored it. Further, the forwarding group information collector 161 requests the forwarding group information 251 to the vehicle electronic system 200 and receives it from vehicle electronic system 200 when a communication service connection request message is received from the transmission terminal 109. The forwarding group information collector 161 of the second portable terminal 102 provides identification information to the vehicle electronic system 200. When receiving the forwarding group information 251 or communication service forwarding from the first portable terminal 101 in response thereto, the forwarding group information collector 161 receives the forwarding group information 251 from the first portable terminal 101 or the vehicle electronic system 200. Based on this, the second portable terminal 102 again forwards the received communication service forwarding to another terminal, for example, the third portable terminal 103 or rejects the communication service forwarding.

If the forwarding supporting unit 165 receives the forwarding group information, the forwarding group information output unit 163 outputs it to the display unit 140. The forwarding group information output unit 163 outputs the forwarding group information 251 with output to a screen according to reception of the communication service connection request message. A screen interface associated with output to the forwarding group information will be described in detail with reference to drawings to be illustrated below.

The forwarding supporting unit 165 supports a communication service forwarding function of the forwarding supporting unit 165. When the user selects a link item corresponding to a certain portable terminal in an output state of the forwarding group information 251, the forwarding supporting unit 165 collects information linked with the corresponding item, for example, information for performing communication connection with the second portable terminal 102, and transfers a communication service connection request message to the second portable terminal 102 based on the collected information. The forwarding supporting unit 165 ensures that that a communication service connection request message is forwarded using the second communication unit 170 establishing a communication channel with the vehicle communication unit 210. When receiving the communication service connection request message provided through the vehicle communication unit 210, the forwarding supporting unit 165 of the second portable terminal 102 ensures that it is output to the display unit 140. Further, when the user accepts forwarding, the forwarding supporting unit 165 of the second portable terminal 102 transfers the forwarding acceptance message to the first portable terminal 101 through the vehicle communication unit 210. The forwarding supporting unit 165 of the first portable terminal 101 checks a forwarding acceptance message received through the vehicle communication unit 210, perform communication service connection with the transmission terminal 109, and ensures that data transmitted/received to and from the transmission terminal 109 are forwarded to the second portable terminal 102 through the vehicle communication unit 210. Further, the forwarding supporting unit 165 provides forwarding information to the second portable terminal 102, for example, a phone number of the second portable terminal 102 to the mobile communication system 300 such that the transmission terminal 109 and the second portable terminal 102 perform a mutual communication service.

Figure 5:
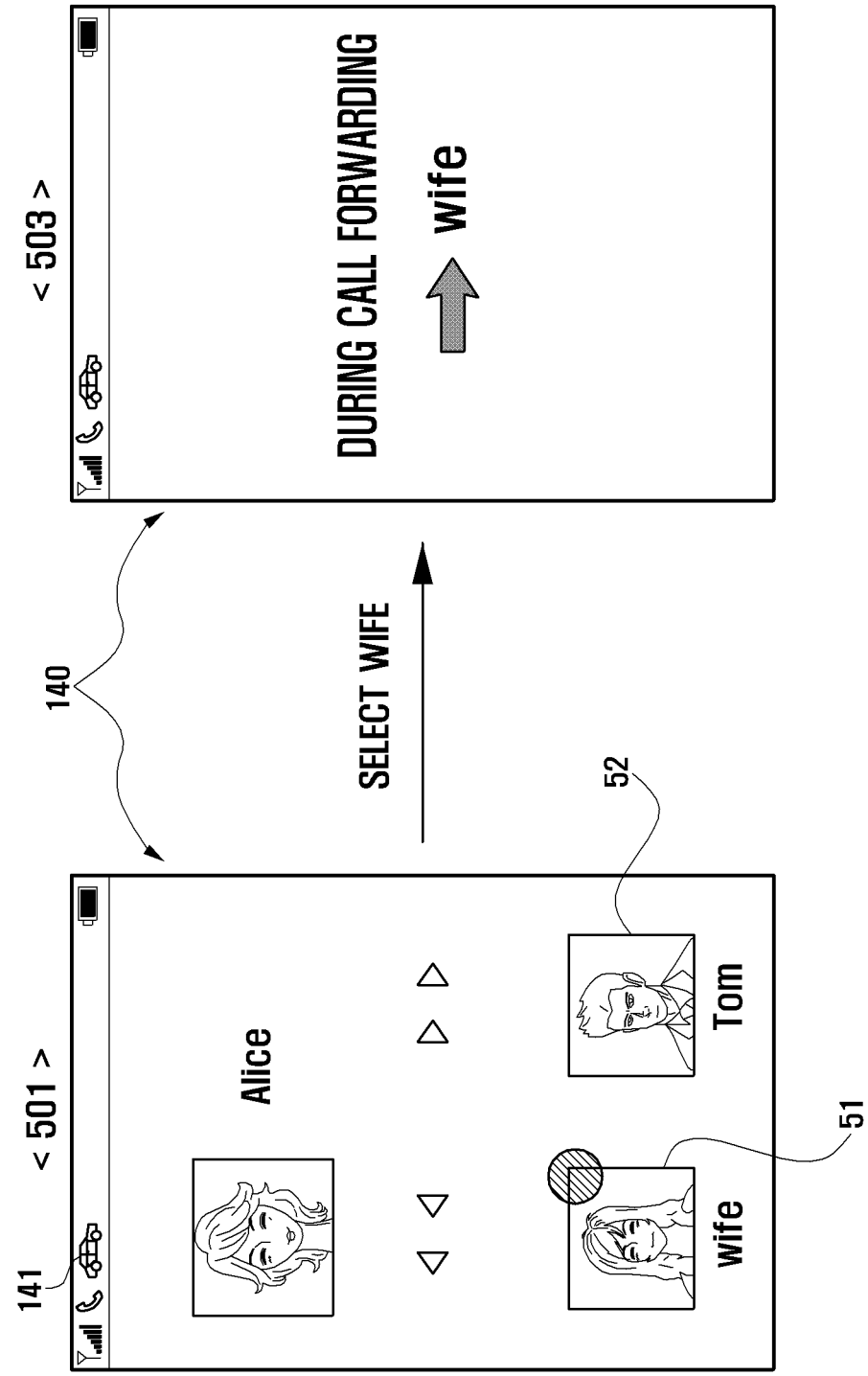
FIG. 5 is a diagram illustrating a screen interface associated with a communication service forwarding function according to an embodiment of the present invention.

FIG. 5 is a diagram illustrating a screen interface of a forwarding supporting unit 165 according to an embodiment of the present invention. Hereinafter, a screen interface will be described with reference to a call service of communication services.

The first portable terminal 101 receives a call service connection request message from the transmission terminal 109. Accordingly, the first portable terminal 101 outputs a screen according to the reception of the communication service connection request message as illustrated in a screen 501. The first portable terminal 101 ensures that the transmission terminal 109 determines photograph information corresponding to the transmission terminal 109 stored in a phone-book corresponding to an item stored in the phone-book and outputs the determined photograph information to the display unit 140. When there is no photograph information, the first portable terminal 101 ensures that the phone number information or name information corresponding the transmission terminal 109 are output to the display unit 140.

Further, the first portable terminal 101 receives the forwarding group information 251 and output the received forwarding group information as illustrated in a screen 501 of FIG. 5. The forwarding group information 251 contains information "wife" corresponding to the second portable terminal 102 and information "Tom" corresponding to the third portable terminal 103. Accordingly, the display unit 140 outputs a first link item 51 and a second link item 52 corresponding to the second portable terminal 102 and the third portable terminal 103. In particular, the first portable terminal 101 configures the first link item 51 and the second link item 52 based on photograph and image information included in the forwarding group information 251. When there is no photograph or image information, the first portable terminal 101 substitutes and outputs phone number or name information of respective portable terminals for the first link item 51 and the second link item 52.

The first portable terminal 101 user generates an input signal designating one of the first link item 51 and the second link item 52 as a forwarding selection terminal. When the display unit 140 supports a touchscreen function, the user generates an input signal touching a first link item 51 corresponding to the second portable terminal 102 output on the display unit 140. The first portable terminal 101 then outputs a screen indicating that it performs call service forwarding as illustrated in screen 503. During this procedure, the first portable terminal 101 transfers a call service connection request message to the second portable terminal 102. Moreover, the first portable terminal 101 may process data transmission/reception associated with call service forwarding by background processing. After the first portable terminal 101 does not return to a previous screen but maintains screen 503 indicating that call service forwarding is being performed, when a corresponding call service is terminated, it controls returning to a previous screen.

When the second portable terminal 102 returns a forwarding acceptance message with respect to a call service connection request message, the first portable terminal 101 outputs a screen corresponding to acceptance of the call service forwarding. Moreover, the first portable terminal 101 ensures that it is restored to a screen output on the display unit 140.

Restoration to the previous screen is changed according to a system design scheme. For example, when a call service forwarding function and data transmission/reception associated with a call service are performed through the vehicle communication unit 210, the first portable terminal 101 may maintain output of screen 503 to a call service termination. When the second portable terminal 102 excludes the first portable terminal 101 and the vehicle electronic system 200 but directly operates a call service with the transmission terminal 109 after acceptance of call service forwarding, the first portable terminal 101 restores a previous screen after completing call forwarding.

Additionally, when the first portable terminal 101 is located in the vehicle 201 and enters a vehicle mode by performing registration in the vehicle electronic system 200, it outputs a vehicle mode indicator 141 indicating that it is in a vehicle mode on a side of the screen or an indicator region. Accordingly, the user easily recognizes that the first portable terminal 101 is currently operated in a vehicle mode, and accordingly a communication service is forwarded.

Figure 6:
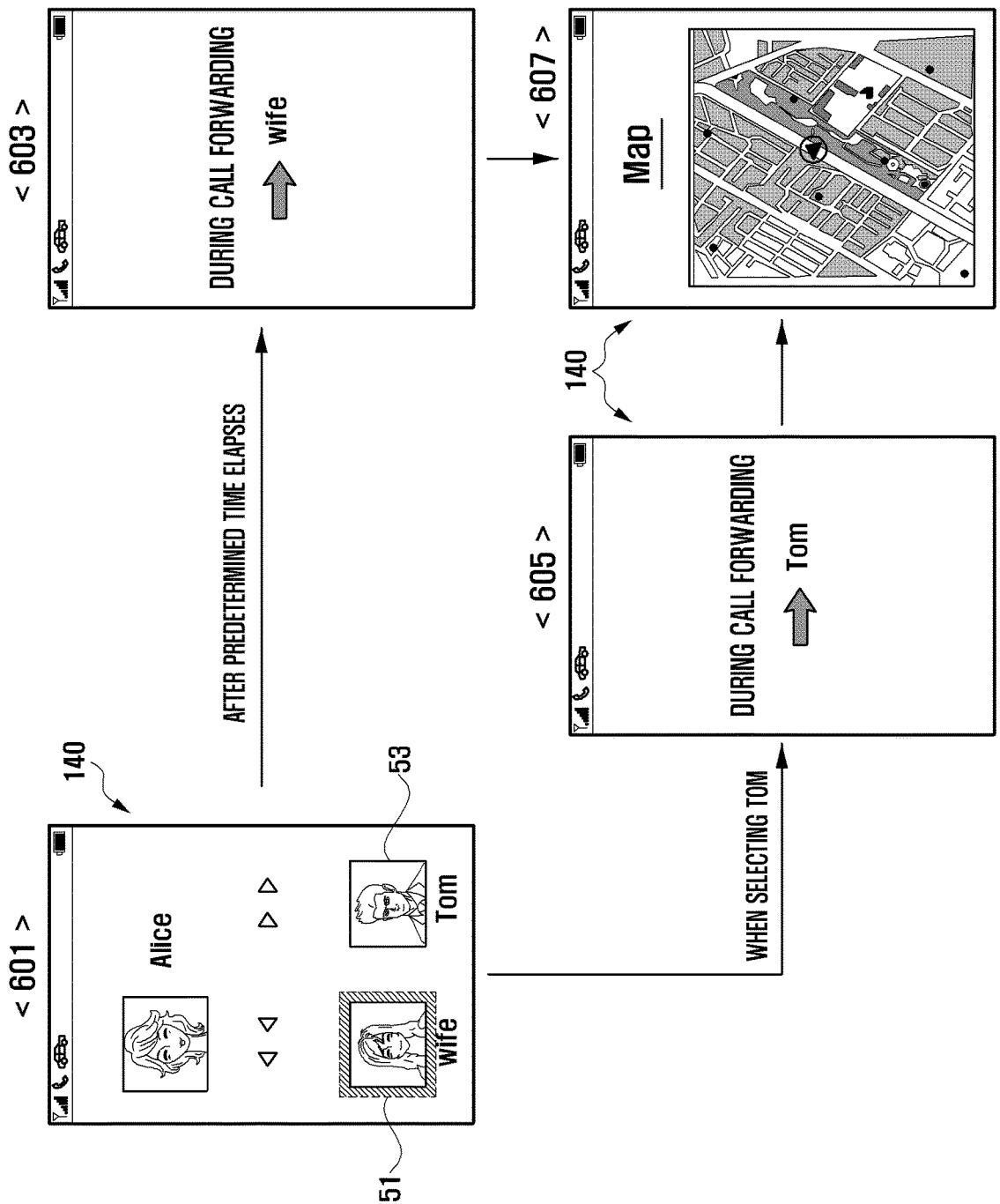
FIG. 6 is a diagram illustrating a screen interface associated with a communication service forwarding function according to an embodiment of the present invention.

FIG. 6 is a diagram illustrating an example of a screen interface of a portable terminal 100 according to another embodiment of the present invention.

The first portable terminal 101 receives a call service connection request message from the transmission terminal 109. The first portable terminal 101 then outputs a screen according to the reception of a call service connection request message as illustrated in screen 601 in the same manner as in the screen 501. Further, the first portable terminal 101 outputs the forwarding group information 251 received from the vehicle electronic system 200 as illustrated in the screen 601 of FIG. 6. Accordingly, the first portable terminal 101 outputs a call service connection request screen in which the first link item 51 and the second link item 52 are output to a side of the screen.

After outputting the screen 601 to the display unit 140 for a predetermined time, when a predetermined time elapses, the first portable terminal 101 outputs a screen 603. The first portable terminal 101 checks forwarding setting information 153 stored in the memory 150, automatically designates a forwarding selection terminal, for example, a second portable terminal 102, and ensures that call service forwarding to the second portable terminal 102 is performed. The first portable terminal 101 highlights the display to allow a user to recognize that the second portable terminal 102 is designated as a forwarding selection terminal. When a call service connection request message from the transmission terminal 109 through background processing without an output procedure of screens 601 and 603, the first portable terminal 101 controls the second portable terminal 102 registered as the forwarding group information to automatically forward the call service connection request message. The second portable terminal 102 is located in the vehicle 201 and becomes a terminal registered with forwarding group information 251 by the vehicle electronic system 200. Further, the second portable terminal 102 is not located in the vehicle 201, but becomes a terminal of a certain place designated by the first portable terminal 101. The second portable terminal 102 then performs a call with the transmission terminal 109 and transfers a calling content to the first portable terminal 101 with messages to remove a driving hindrance factor of performing a direct call by the user. In this procedure, the first portable terminal 101 informs the transmission terminal 109 that it is forwarded to the second portable terminal 102 to form a call channel with the second portable terminal 102 in a state that the user recognizes during forwarding.

The first portable terminal 101 user controls a forwarding function to a certain terminal before a predetermined time elapses. When receiving the call service connection request message, the first portable terminal 101 user checks the transmission terminal 109 and ensures that a corresponding call service connection request message to the third portable terminal 103. To accomplish this, the first portable terminal 101 selects an input signal selecting a second link item 52 corresponding to the third portable terminal 103. The display unit 140 of the first portable terminal 101 then outputs a screen indicating that call service forwarding is being performed to "Tom" being a third portable terminal 103 user as illustrated in screen 605.

If the call forwarding is terminated, the first portable terminal 101 restores a previous screen as illustrated in screen 607. Here, the screen 607 indicates that a first portable terminal 101 previously outputs map information. Accordingly, although the user receives a call service connection request message, the first portable terminal 101 user confirms map information without being disturbed, to safely arrive at his destination.

Additionally, as illustrated previously, the second portable terminal 102 or the third portable terminal 103 selected to forward a communication service outputs forwarding ground information 251 on a screen and output a screen informing communication service forwarding. Accordingly, the second portable terminal 102 of the third portable terminal 103 ensures that communication service forwarding is accepted or corresponding communication service forwarding is again forwarded to another terminal.

As illustrated above, the communication service forwarding function of the present invention automatically performs vehicle mode entry when a driver is located in the vehicle 201 to pay attention to driving, and support such that a communication service to a forwarding selection terminal set or selected by the user based on a vehicle mode. The communication service forwarding function of the present invention is automatically released when the user releases a vehicle mode or the portable terminal is beyond a communication distance of the vehicle communication unit 210. Accordingly, the portable terminal 100 of the present invention ensures that a communication service forwarding function is released to perform service support according to a general communication service function.

The foregoing embodiment has illustrated a configuration of a system and portable terminals for supporting a communication service forwarding function and functions thereof. Hereinafter, various methods for supporting a communication service forwarding function of the present invention will be described in detail with reference to the accompanying drawings.

Figure 7:
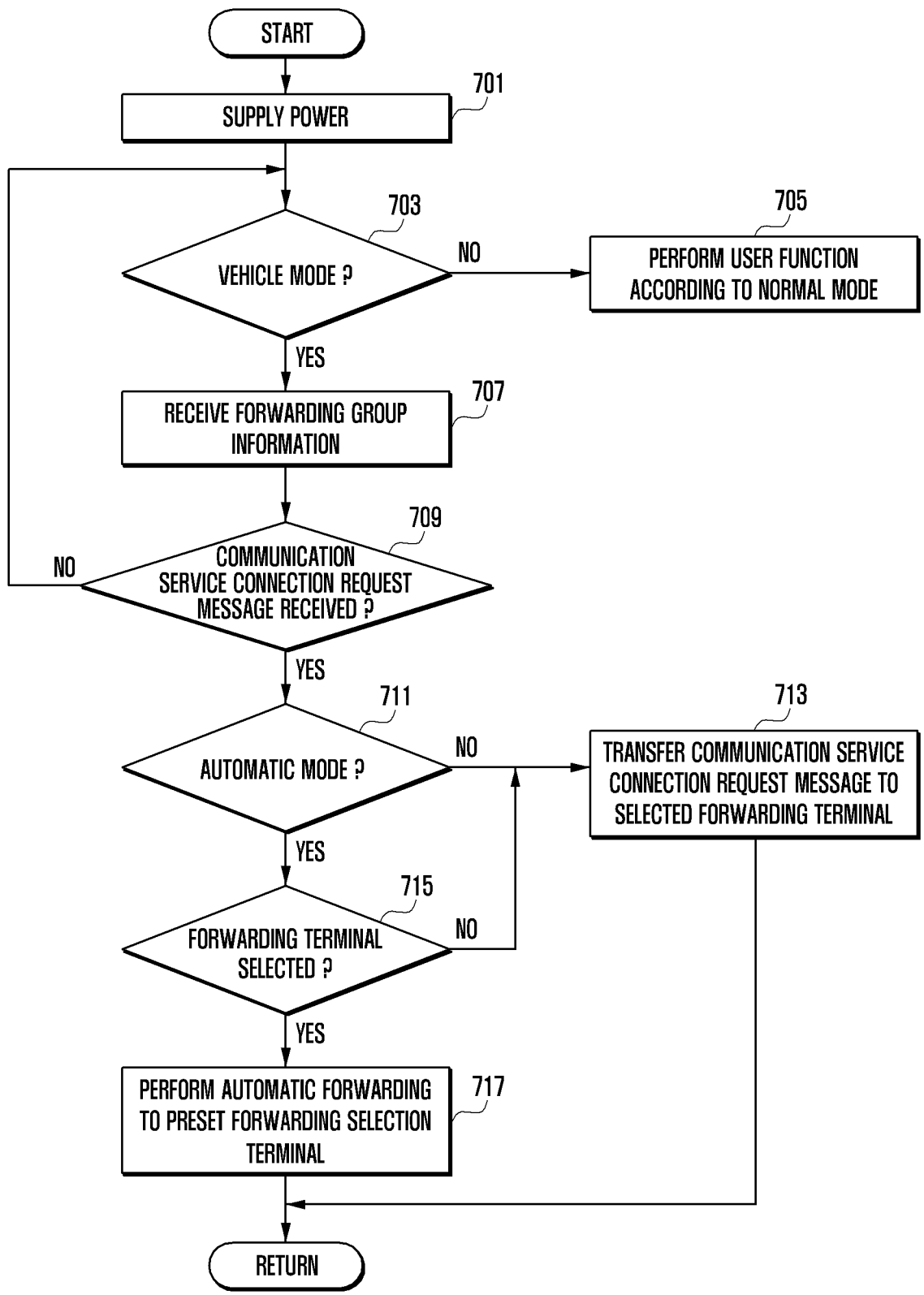
FIG. 7 is a flowchart illustrating a method of operation of a portable terminal for supporting a communication service forwarding function according to an embodiment of the present invention.

FIG. 7 is a flowchart illustrating a method of operation of a portable terminal for supporting a communication service forwarding function according to an embodiment of the present invention, particularly, which is a flowchart illustrating an operation method of a first portable terminal 101 first receiving a communication service connection request message from a transmission terminal 109.

Referring to FIG. 7, in the operation method of a portable terminal according to the present invention, a controller 160 of a first portable terminal 101 receives power from a power supply and perform power distribution necessary for operations of respective structural elements in step 701.

Next, the first portable terminal 101 determines whether it enters a vehicle mode in step 703. To accomplish this, the first portable terminal 101 is located within an allowable communication range and performs registration in the vehicle communication unit 210. The vehicle communication unit 210 performs a function of an AP with respect to the first portable terminal 101. If establishing a communication channel with the vehicle communication unit 210, the first portable terminal 101 provides identification information to the vehicle electronic system 200 through the vehicle communication unit 210. If registration of the vehicle communication unit 210 is terminated, the first portable terminal 101 determines it as entering the vehicle mode. In this case, the first portable terminal 101 outputs a pop-up window inquiring presence of entering the vehicle mode on the display unit 140, and ensures that entering the vehicle mode is cancelled or the vehicle mode is not entered.

When the first portable terminal 101 does not enter the vehicle mode at step 703, it supports a terminal function according to user input in step 705. For example, the first portable terminal 101 ensures that certain user functions such as a navigation function, a file search function, a file playback function, and a broadcasting receiving function are performed according to an input signal provided from the input unit 120 or a display unit 140 of an input function.

When entering the vehicle mode is performed at step 703, the portable terminal 101 receives forwarding group information 251 from a vehicle electronic system 200 in step 707. To accomplish this, the vehicle electronic system 200 collects identification information of portable terminals located in the vehicle 201 in a registration procedure, and generate forwarding group information 251 based on the collected identification information of the portable terminals. A procedure of receiving forwarding group information 251 is performed after step 709 to be described later.

The first portable terminal 101 then determines whether a communication service connection request message is received from the transmission terminal 109 in step 709. To accomplish this, the transmission terminal 109 transmits a communication service connection request message to the first portable terminal 101 through the mobile communication system 300. When a separate communication service connection request message is not received, the first portable terminal 101 performs a user function according to user input while maintaining a vehicle mode state.

When the communication service connection request message is received from the transmission terminal 109 at step 709, the first portable terminal 101, the first portable terminal 101 outputs a screen according to reception of the communication service connection request message on a display unit 140. The first portable terminal 101 outputs forwarding group information 251 together with the display unit 140. The first portable terminal 101 determines whether an automatic mode of a communication service forwarding function is set in step 711. The automatic mode of the communication service forwarding function is a mode of forwarding a communication service to a certain preset portable terminal without selection of a terminal performing forwarding. When the automatic mode is not set, the first portable terminal 101 transfers a communication service connection request message to a forwarding terminal selected by the user in step 713. The user designates a certain terminal from the forwarding group information 251 output on the display unit 140 as a forwarding selection terminal.

However, when the automatic mode is selected at step 711, the first portable terminal 101 determines whether an input signal for selecting a forwarding terminal is generated in step 715. When a certain forwarding terminal is selected at step 715, the process may go to step 713. To accomplish this, the first portable terminal 101 waits for a predetermined time for selecting the forwarding terminal. Further, the first portable terminal 101 outputs information with respect to a terminal automatically performing communication service forwarding on the display unit 140. When a separate forwarding terminal is not selected at step 715, the first portable terminal 101 controls a forwarding selection terminal previously set in the forwarding setting information 153, for example, the second portable terminal 102 to automatically perform the communication service forwarding in step 717. Here, the second portable terminal 102 is a terminal belonging to the forwarding group information 251 generated by the vehicle electronic system 200. The second portable terminal 102 is a terminal that the first portable terminal 101 user optionally inputs.

Accordingly, the first portable terminal 101 forwards a communication service connection request message received while a driver is driving a vehicle to another portable terminal that lets the driver to pay attention to driving. Further, although the first portable terminal 101 user does not drive the vehicle, the first portable terminal 101 ensures that communication service forwarding to another portable terminal in the vehicle 201 is easily performed according to a need of the user.

Figure 8:
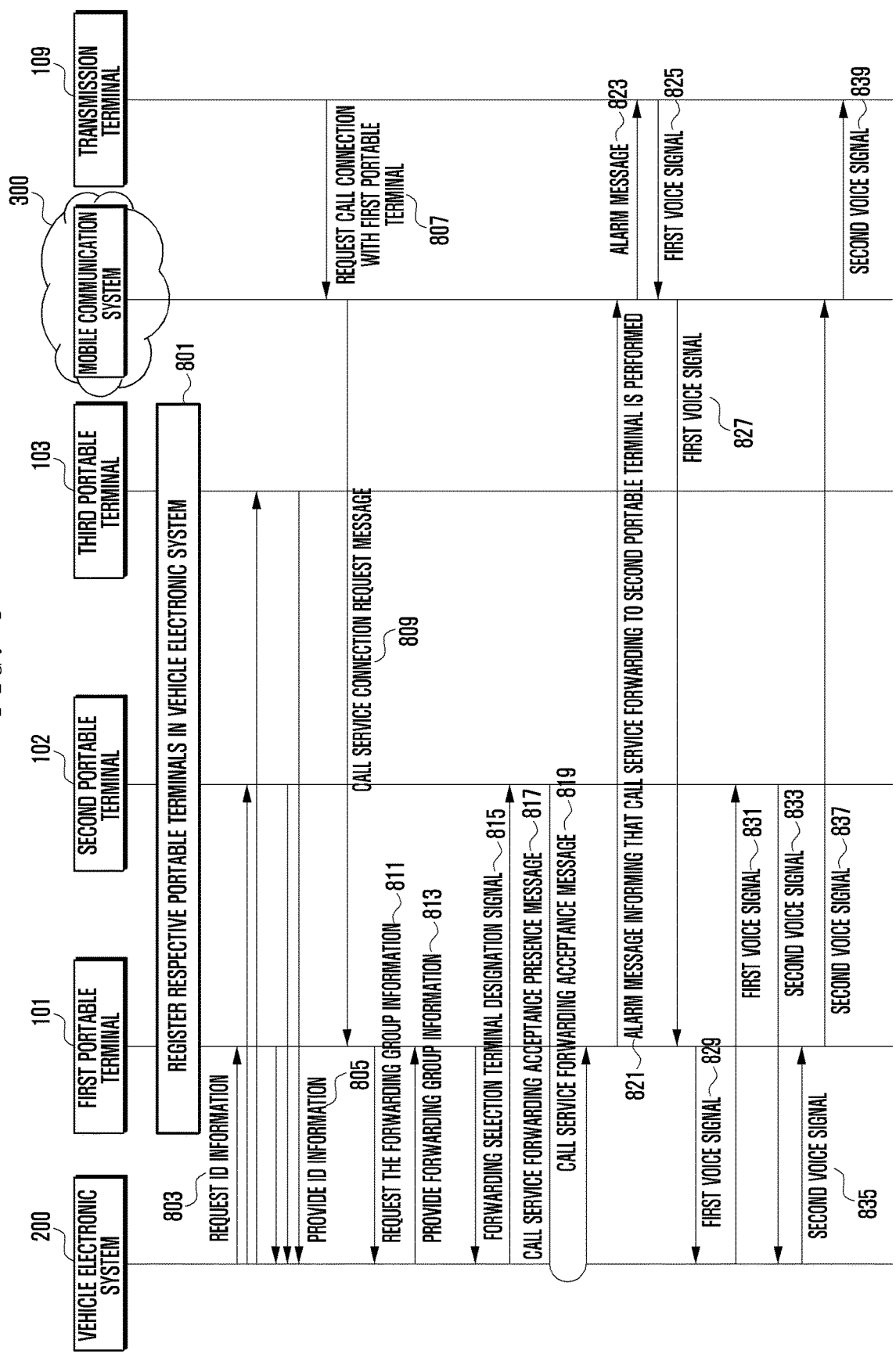
FIG. 8 is a flowchart illustrating a method of forwarding a communication service based on a vehicle according to an embodiment of the present invention.

FIG. 8 is a flowchart illustrating a method of forwarding a communication service based on a vehicle according to an embodiment of the present invention. Hereinafter, a call service will be described as an example of communication services.

Referring to FIG. 8, in the method of forwarding a communication service according to the present invention, portable terminals 101, 102, and 103 communicates with a vehicle electronic system 200 within an allowable communication range, for example, in a vehicle 201 to perform registration in a vehicle communication unit 210 in step 801. The portable terminals 101, 102, and 103 perform an SSID search of the vehicle communication unit 210. When security is set, the portable terminals performs an authentication procedure and be registered in the vehicle communication unit 210. Conversely, when the security is not set, the portable terminals are registered in the vehicle communication unit 210 without performing the authentication procedure.

When the portable terminals 101, 102, 103 are registered in the vehicle electronic system 200, the vehicle electronic system 200 requests IDentification (ID) information for communication service forwarding to the respective portable terminals 101, 102, 103 in step 803. Then, the portable terminals 101, 102, and 103 provide each ID information to the vehicle electronic system 200 in step 805. Here, the ID information contains terminal ID, phone numbers, a name, and photograph information. The vehicle electronic system 200 collecting the ID information from the respective portable terminals 101, 102, and 103 combines the collected ID information to generate forwarding group information 251.

A transmission terminal 109 then requests call connection with a first portable terminal 101 to a mobile communication system 300 in step 807. Then, the mobile communication system 300 controls the first portable terminal 101 to transmit a message corresponding to a call service connection request in step 809. To accomplish this, the mobile communication system 300 searches a base station in which the first portable terminal 101 is located and controls a corresponding base station to transmit a call service connection request message to the first portable terminal 101.

The first portable terminal 101 receiving the call service connection request message requests the forwarding group information 251 to the vehicle electronic system 200 in step 811. The step of providing the forwarding group information 251 is adjusted to be performed immediately after the vehicle electronic system 200 generates the forwarding group information 251. The forwarding group information 251 is provided to respective portable terminals 101, 102, and 103 without separate request from the portable terminals 101, 102, and 103. Accordingly, the respective portable terminals 101, 102, and 103 store and manage the forwarding group information 251 while they are located in the vehicle 201.

If the vehicle electronic system 200 receives a request signal of the forwarding group information 251, it provides the forwarding group information 251 to the first portable terminal 101 in step 813. Then, the first portable terminal 101 ensures that the received forwarding group information 251 and a screen interface according to reception of the call service connection request message are output on the display unit 140. Accordingly, the first portable terminal 101 user recognizes that a current state is a state that call service connection is requested from the transmission terminal 109 and a call service forwarding to the second portable terminal 102 and the third portable terminal 103 is possible. Next, the first portable terminal 101 user generates an input signal designating a certain terminal, for example, the second portable terminal 102 as a forwarding selection terminal. The generated input signal, namely, a forwarding selection terminal designation signal is then transferred to the vehicle electronic system 200 in step 815.

When the vehicle electronic system 200 receives the forwarding selection terminal designation signal, it transmits a call service forwarding acceptance presence message to the second portable terminal 102 designated in step 817. The second portable terminal 102 then outputs a screen interface regarding presence of a call service forwarding acceptance on a display unit. Accordingly, the second portable terminal 102 user recognizes that the first portable terminal 101 currently instructs call service forwarding. The second portable terminal 102 outputs the forwarding group information 251 together with the display unit 140 such that the user again forwards the received call service forwarding to another portable terminal, for example, the third portable terminal 103.

When the second portable terminal 102 user accepts the call service forwarding, the second portable terminal 102 transfers a call service forwarding acceptance message to the first portable terminal 101 through the vehicle electronic system 200 in step 819. Accordingly, the first portable terminal 101 transfers an alarm message informing the mobile communication system 300 that call service forwarding to the second portable terminal 102 is performed in step 821.

The mobile communication system 300 then transfers the alarm message to the transmission terminal 109 and form a communication channel for call connection of the transmission terminal 109 in step 823.

Accordingly, a communication path including the transmission terminal 109, the mobile communication system 300, the first portable terminal 101, the vehicle electronic system 200, and the second portable terminal 102 is formed, and a call service between the second portable terminal 102 and the transmission terminal 109 is supported through the communication path. In more detail, when the transmission terminal 109 transfers a first voice signal to a mobile communication system 300 in step 825*a* voice signal transfer procedure is performed, that is, the mobile communication system 300 transfers the first voice signal to the first portable terminal 101 in step 827, the first portable terminal 101 transfers the first voice signal to the vehicle electronic system 200 in step 829, and the vehicle electronic system 200 transfers the first voice signal to the second portable terminal 102 in step 831. The voice signal transfer procedure of the second portable terminal 102 includes a step of transferring a second voice signal to a vehicle electronic system 200 by the second portable terminal 102 in step 833, a step of transferring the second voice signal to the first portable terminal 101 by the vehicle electronic system 200 in step 835, a step of transferring the second voice signal to a mobile communication system 300 by the first portable terminal 101 in step 837, and a step of transferring the second voice signal to the transmission terminal 109 by the mobile communication system 300 in step 839.

Figure 9:
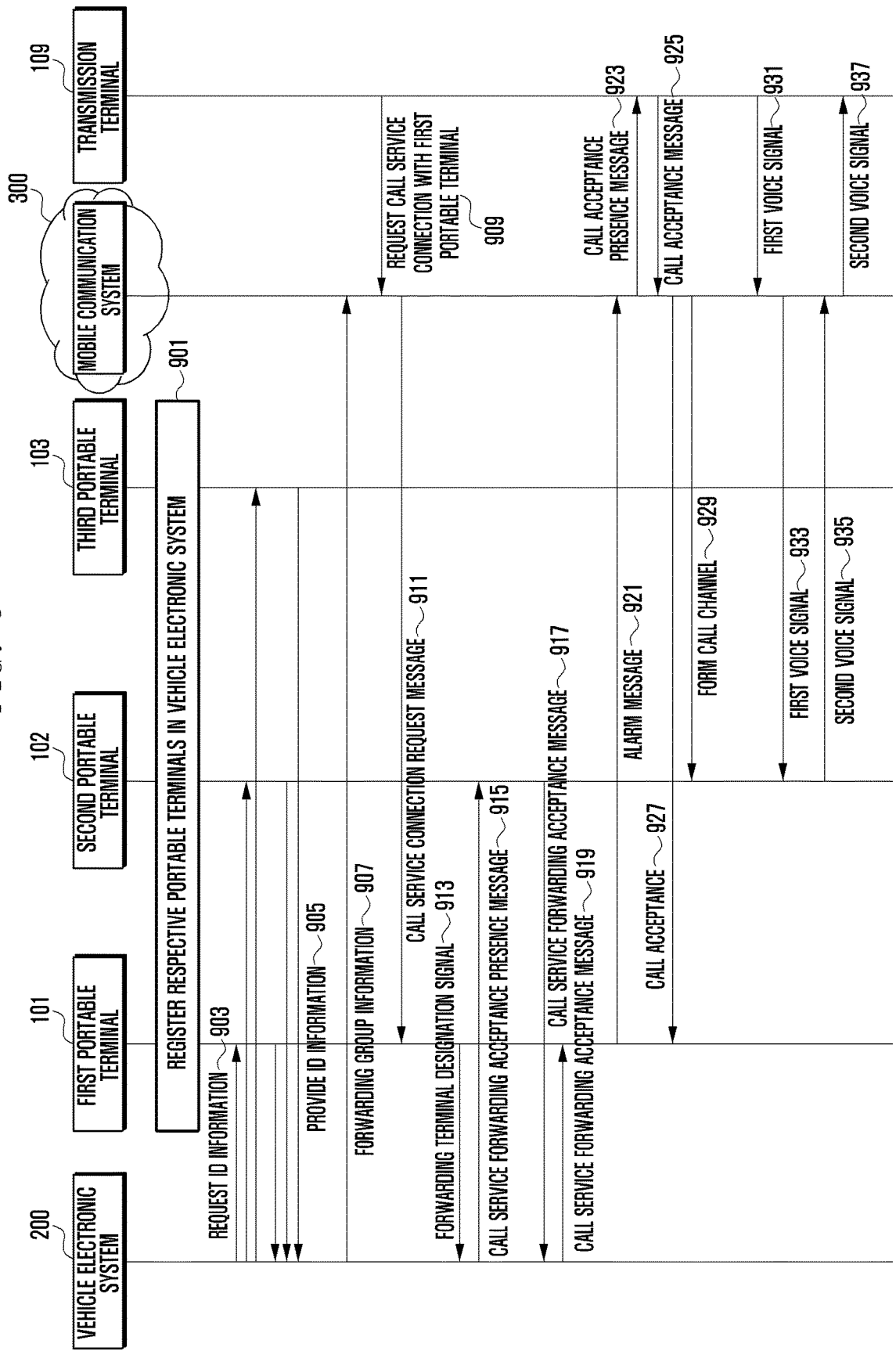
FIG. 9 is a flowchart illustrating a method of forwarding a communication service based on a vehicle according to another embodiment of the present invention.

FIG. 9 is a signal flowchart illustrating a method of forwarding a communication service according to a second embodiment of the present invention.

Hereinafter, a call service forwarding method will be described as an example of communication service forwarding methods. Before the description, step 901, step 903, and step 905 are implemented in the same manner as step 801, step 803, and step 805, respectively, and thus a detailed description thereof is omitted.

Referring to FIG. 9, in the call service forwarding method, a vehicle electronic system 200 generates forwarding group information 251 based on ID information received from the portable terminals 101, 102, and 103, and provide the generated forwarding group information 251 to the mobile communication system 300 in step 907. To accomplish this, the vehicle electronic system 200 includes a communication module capable of communicating with the mobile communication system 300. When forwarding setting information setting to automatically forward a communication service connection request message to another terminal is included in the forwarding group information 251, the method of forwarding a communication service of the present invention omits a part of following procedures and establishes a communication channel between a forwarding terminal set with automatic forwarding and the transmission terminal 109. The mobile communication system 300 informs the first portable terminal 101 that a communication service connection request message according to communication service connection request from the transmission terminal 109. Moreover, the mobile communication system 300 informs the transmission terminal 109 that the first portable terminal 101 is in a vehicle mode, and a corresponding communication service connection request message is transferred to a second portable terminal 102 designated as a forwarding terminal. Subsequently, both of the second portable terminal 102 and the transmission terminal 109 accept communication service connection, the mobile communication system 300 establishes a communication channel between the second portable terminal 102 and the transmission terminal 109.

The transmission terminal 109 requests call service connection with the first portable terminal 101 to the mobile communication system 300 in step 909. To accomplish this, the transmission terminal 109 may input phone numbers of the first portable terminal 101, and perform call dial based on the phone numbers.

When the mobile communication system 300 receives request of a call service connection with the first portable terminal 101, it transfers a call service connection request message and forwarding group information 251 to the first portable terminal 101 in step 911.

When the first portable terminal 101 receives the call service connection request message and the forwarding group information 251, it outputs them to the display unit 140. The first portable terminal 101 user then recognizes reception of the call service connection request, and generates an input signal for selecting another terminal, for example, a second portable terminal from the forwarding group information 251, and designates the selected terminal as a forwarding terminal. Accordingly, the first portable terminal 101 provides a designation signal for designating the second portable terminal as a forwarding terminal for call service forwarding to the vehicle electronic system 200 in step 913.

When the vehicle electronic system 200 receives a forwarding terminal designation signal from the first portable terminal 101, it transfers a call service forwarding acceptance presence message to a second portable terminal 102 designated by the forwarding terminal designation signal in step 915. When receiving the call service forwarding acceptance presence message, the second portable terminal 102 then outputs the reception of a corresponding message to the display unit such that the second portable terminal 120 user checks presence of forwarding. When the user accepts the forwarding, the second portable terminal 102 ensures that a call service forwarding acceptance message is transferred to the vehicle electronic system 200 in step 917.

When receiving the call service forwarding acceptance message, the vehicle electronic system 200 transfers the call service forwarding acceptance message to the first portable terminal 101 in step 919, and the first portable terminal 101 transfers an alarm message informing that the call service is forwarded to the second portable terminal 102 to the mobile communication system 300 in step 921. The mobile communication system 300 transfers a call acceptance presence message with the second portable terminal 102 according to call service forwarding to the transmission terminal 109 in step 923. When accepting it, the transmission terminal 109 transfers a call acceptance message with the second portable terminal 102 to the mobile communication system 300 in step 925. Subsequently, the mobile communication system 300 transfers call acceptance of the transmission terminal 109 to the first portable terminal 101 in step 927, and form a call channel between the transmission terminal 109 and the second portable terminal 102 in step 929.

As illustrated above, the method of forwarding a communication service of the present invention performs a communication service based on a communication path including a transmission terminal 109, a mobile communication system 300, and a second portable terminal 120 according to communication service forwarding. More specifically, a voice signal transmitting procedure of the transmission terminal 109 includes a step of transmitting a first voice signal to a mobile communication system 300 by the transmission terminal 109 in step 931, and a step of transferring a first voice signal to a second portable terminal 102 by the mobile communication system 300 in step 933. Further, a voice signal transmitting procedure of the second portable terminal 102 includes a step of transferring a second voice signal to the mobile communication system 10 by the second portable terminal 102 in step 35, and a step of transferring the second voice signal to the transmission terminal 109 by the mobile communication system 10 in step 937.

As illustrated above, when a first portable terminal 101 is located in the vehicle 201, and enters a vehicle mode, a method of forwarding a communication service according to an embodiment of the present invention forwards a communication service dialed from the first portable terminal, for example, call connection request to another terminal, so that a driver with the first portable terminal 101 can pay attention to driving. Accordingly, the method of the present invention ensures that stable driving is achieved.

Here, the foregoing embodiment has illustrated the method of forwarding a communication service of the present invention with reference to a call service. However, the present invention is not limited thereto. The method of forwarding a communication service of the present invention may support a forwarding function with respect to reception of SMS, multi-media message, e-mail or SNS message. To do this, the first portable terminal 101 outputs a screen interface including forwarding information 251 to check whether to forward a service to another terminal before reception of a message according to a corresponding message service.

When entering a vehicle mode, the first portable terminal 101 ensures that a corresponding message is automatically forwarded to another portable terminal according to forwarding setting information 153. To do this, the first portable terminal 101 checks forwarding setting information 153 in a vehicle mode entering procedure to set to which terminal the foregoing message are forwarded with default. In this procedure, a first portable terminal 101 user configures forwarding setting information 153 using the first portable terminal 101, and directly operate the vehicle electronic system 200 to configure the forwarding setting information 153. In this case, another terminal receiving forwarding of a corresponding communication service is located in the vehicle 201, and become a terminal included in the forwarding group information 251 or a certain terminal of a certain place optionally designated by the first portable terminal 101 user.

In the meantime, the foregoing method has illustrated that the second portable terminal 102 directly accepts call service forwarding by way of example. However, the second portable terminal 102 can again apply call service forwarding to another portable terminal, for example, a third portable terminal 103. To do this, when receiving a message inquiring presence of call service forwarding acceptance, the second portable terminal 102 receives the forwarding group information 251 from the first portable terminal 101 or the vehicle electronic system 200, and output it on a display unit. As the second portable terminal 102 again applies call service forwarding to the third portable terminal 103, when the third portable terminal accepts it, a communication path is configured to include the transmission terminal 109, the mobile communication system 300, the first portable terminal 101, the vehicle electronic system 200, and the third portable terminal 103. The communication path is configured by a path including the transmission terminal 109, the mobile communication system 300, and the third portable terminal 103.

The foregoing portable terminal 100 may further include various additional modules according to provision forms. That is, when the portable terminal 100 is a communication terminal, it includes parts that are not mentioned such as a near-distance communication module for near-distance communication, an interface exchanging data in a wired communication scheme or a wireless communication scheme of the mobile terminal 100, an Internet communication module communicating with an Internet to perform an Internet function, and a digital broadcasting module receiving and broadcasting digital broadcasting. Since the structural elements can be variously changed according to convergence trend of a digital device, no elements can be listed. However, the portable terminal 100 includes structural elements equivalent to the foregoing structural elements. Further, the terminal 100 of the present invention may be substituted by specific constructions in the foregoing arrangements according to the provided form or another structure. This can be easily understood to those skilled in the present art.

Further, the portable terminal 100 according to an embodiment of the present invention includes various types of devices supporting a communication service forward function. For example, the mobile terminal 100 includes an information communication device and a multimedia device such as a Portable Multimedia Player (PMP), a digital broadcasting player, a Personal Digital Assistant (PDA), a music player (e.g., an MP3 player), a portable game terminal, a SmartPhone, a notebook computer, and a handheld PC as well as various mobile communication terminals corresponding to various communication systems.

In a method of forwarding a communication service based on a vehicle, a system thereof, and a terminal supporting the same, when a communication service connection request is received from a driver, it forwards a communication service to a terminal carried by a certain person to perform stable driving.

Additionally, although a driver or a passenger performs a communication service, the present invention allows a user to use the communication service at a more comfortable and safer time.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An electronic device for forwarding a communication service, the electronic device comprising:
   a communication module configured to receive a communication service request from an external electronic device;
   a display; and
   a processor configured to:
      detect that the communication module receives the communication service request from the external electronic device,
      transmit, to a vehicle electronic system, a request for information of electronic devices registered in the vehicle electronic system,
      in response to receiving the information of the electronic devices registered in the vehicle electronic system, control the display to display a list of the electronic devices registered in the vehicle electronic system, and
      in response to receiving a user input for selecting one of the electronic devices registered in the vehicle electronic system, forward the received communication service request to the selected electronic device.

2. The electronic device of claim 1, wherein the processor is further configured to transmit a signal indicating the selected electronic device to the vehicle electronic system and instructing the vehicle electronic system to transmits a request for forwarding to the selected electronic device.

3. The electronic device of claim 1, wherein the processor is further configured to forward the received communication service request to a pre-designated electronic device, in response to the user input not being received for a predetermined period of time.

4. The electronic device of claim 1, wherein the processor is further configured to control the display to display a previously displayed screen, in response to determining that the forwarding to the selected electronic device is completed.

5. The electronic device of claim 1, wherein the processor is further configured to transmit, to the external electronic device, an indication that forwarding is to be performed to the selected electronic device.

6. The electronic device of claim 1, wherein the processor is further configured to:
   establish a first communication channel between the electronic device and the vehicle electronic system, and
   establish a second communication channel between the selected electronic device and the electronic device, and
   wherein the first communication channel is a short distance communication channel and the second communication channel is a cellular network channel.

7. The electronic device of claim 6, wherein the processor is further configured to:
   receive a voice signal through the second communication channel from the external electronic device, and
   transmit the received voice signal through the first communication channel to the vehicle electronic device.

8. A vehicle electronic system for forwarding a communication service, the vehicle electronic system comprising:
   a memory configured to store information of electronic devices registered in the vehicle electronic system;
   a communication module; and
   a processor configured to:
      in response to receiving, from a first electronic device that has received a call service request message from an external electronic device, a request to transmit the information of the electronic devices registered in the vehicle electronic system, transmit the information of the electronic devices registered in the vehicle electronic system to the first electronic device, and
      in response to receiving, from the first electronic device, an indication of a selected electronic device, transmit a communication service request to the selected electronic device.

9. The vehicle electronic system of claim 8, wherein the processor is further configured to:
   establish a first communication channel between the first electronic device and the vehicle electronic system, and
   establish a second communication channel between the selected electronic device and the vehicle electronic system, and
   wherein the first communication channel and the second communication channel are each a short distance communication channel.

10. The vehicle electronic system of claim 9, wherein the processor is further configured to:
    receive a voice signal through the first communication channel from the first electronic device, and
    transmit the received voice signal through the second communication channel to the selected electronic device.

11. The vehicle electronic system of claim 8, wherein the processor is further configured to, in response to receiving, from the first electronic device, the indication of the selected electronic device, transmit a request for forwarding to the selected electronic device.

12. The vehicle electronic system of claim 8, wherein the processor is further configured to transmit the received communication service request to a pre-designated electronic device, in response to the indication of the selected electronic device not being received for a predetermined period of time.

13. A method for forwarding a communication service by an electronic device, the method comprising:
    receiving, by the electronic device, a communication service request from an external electronic device;
    transmitting, to a vehicle electronic system, a request for information of electronic devices registered in the vehicle electronic system;
    in response to receiving the information of the electronic devices registered in the vehicle electronic system, displaying a list of the electronic devices registered in the vehicle electronic system; and
    in response to receiving a user input selecting one of the electronic devices registered in the vehicle electronic system, forwarding the received communication service request to the selected electronic device.

14. The method of claim 13, the method further comprising transmitting, to the vehicle electronic system, a signal indicating the selected electronic device and instructing the vehicle electronic system to transmits a request for forwarding to the selected electronic device.

15. The method of claim 13, the method further comprising forwarding the received communication service request to a pre-designated electronic device, in response to the user input not being received for a predetermined period of time.

16. The method of claim 13, the method further comprising displaying a previously displayed screen in response to determining that the forwarding to the selected electronic device is completed.

17. The method of claim 13, the method further comprising transmitting, to the external electronic device, an indication that forwarding is to be performed to the selected electronic device.

* * * * *